US009163956B2

United States Patent
Mizunuma et al.

(10) Patent No.: US 9,163,956 B2
(45) Date of Patent: Oct. 20, 2015

(54) ROTATION ANGLE DETECTING DEVICE AND ROTARY DRIVE UNIT BY USE THEREOF

(71) Applicant: DENSO CORPORATION, Kariya, Aichi-pref. (JP)

(72) Inventors: Takehito Mizunuma, Chiryu (JP); Tomoyuki Takiguchi, Okazaki (JP); Akitoshi Mizutani, Okazaki (JP); Yoshiyuki Kono, Obu (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 14/025,877

(22) Filed: Sep. 13, 2013

(65) Prior Publication Data

US 2014/0111193 A1 Apr. 24, 2014

(30) Foreign Application Priority Data

Oct. 24, 2012 (JP) .................................. 2012-234591

(51) Int. Cl.
*G01D 5/12* (2006.01)
*G01D 3/028* (2006.01)
*G01D 5/14* (2006.01)

(52) U.S. Cl.
CPC .................. *G01D 5/12* (2013.01); *G01D 3/028* (2013.01); *G01D 5/145* (2013.01)

(58) Field of Classification Search
None
See application file for complete search history.

(56) References Cited

U.S. PATENT DOCUMENTS

| 6,008,639 | A | 12/1999 | Hiraoka et al. |
| 6,288,533 | B1 * | 9/2001 | Haeberli et al. ........... 324/207.2 |
| 6,356,046 | B1 * | 3/2002 | Koumura et al. ............ 318/696 |
| 6,407,543 | B1 * | 6/2002 | Hagio et al. ............. 324/207.25 |
| 6,498,479 | B1 * | 12/2002 | Hamaoka et al. .......... 324/207.2 |
| 6,756,780 | B2 * | 6/2004 | Hagio et al. ............. 324/207.25 |
| 6,819,102 | B2 * | 11/2004 | Hagio et al. ............. 324/207.25 |
| 6,875,050 | B2 * | 4/2005 | Ito et al. ........................ 439/533 |
| 7,007,666 | B2 * | 3/2006 | Kamimura et al. ........... 123/399 |
| 7,025,005 | B2 * | 4/2006 | Shinozaki et al. .............. 108/20 |
| 7,032,617 | B2 * | 4/2006 | Kurita et al. .................. 137/554 |

(Continued)

FOREIGN PATENT DOCUMENTS

JP 2007-57322 3/2007

OTHER PUBLICATIONS

Office Action (6 pages), dated Sep. 29, 2014, issued in corresponding Korean Application No. 10-2013-125713 and English translation (5 pages).

(Continued)

*Primary Examiner* — Patrick Assouad
*Assistant Examiner* — Suresh K Rajaputra
(74) *Attorney, Agent, or Firm* — Nixon & Vanderhye PC

(57) ABSTRACT

In a rotation angle detecting device, a signal from a first magnetism detecting element is outputted to a signal output part of a first IC package. A first signal output terminal outputs the signal from the first magnetism detecting element to outside. A signal from a second magnetism detecting element is outputted to a signal output part of a second IC package. A second signal output terminal outputs the signal from the second magnetism detecting element to outside. At least one of a power supply terminal and a ground terminal is located between the first and second signal output terminals. A rotary drive unit includes the device, a motor that rotates a detection object, and a motor power source wire. The ground terminal and a motor power source terminal are adjacent to each other.

5 Claims, 7 Drawing Sheets

(56) References Cited

U.S. PATENT DOCUMENTS

| | | | |
|---|---|---|---|
| 7,034,525 B2* | 4/2006 | Mizutani et al. | 324/207.25 |
| 7,148,680 B2* | 12/2006 | Mizutani et al. | 324/207.25 |
| 7,152,581 B2* | 12/2006 | Wayama et al. | 123/399 |
| 7,210,451 B2* | 5/2007 | Ikeda et al. | 123/399 |
| 7,539,284 B2* | 5/2009 | Besson | 378/62 |
| 7,884,600 B2* | 2/2011 | Takahashi | 324/207.25 |
| 7,928,725 B2* | 4/2011 | Takahashi | 324/207.25 |
| 7,946,555 B2* | 5/2011 | Ikeda | 251/129.11 |
| 7,948,231 B2* | 5/2011 | Takahashi et al. | 324/207.25 |
| 8,044,659 B2* | 10/2011 | Ikeda et al. | 324/207.25 |
| 8,479,707 B2* | 7/2013 | Mase | 123/399 |
| 8,635,986 B2* | 1/2014 | Ikeda et al. | 123/403 |
| 8,675,083 B2* | 3/2014 | Kitagawa et al. | 348/211.2 |
| 8,698,491 B2* | 4/2014 | Shintani et al. | 324/207.25 |
| 8,710,832 B2* | 4/2014 | Hiramoto et al. | 324/207.25 |
| 8,779,761 B2* | 7/2014 | Hiramoto et al. | 324/207.25 |
| 8,854,035 B2* | 10/2014 | Akahane et al. | 324/207.25 |
| 8,941,399 B2* | 1/2015 | Hara et al. | 324/713 |
| 2002/0130656 A1* | 9/2002 | Hagio et al. | 324/207.2 |
| 2002/0166362 A1* | 11/2002 | Kubota et al. | 73/1.75 |
| 2003/0136309 A1* | 7/2003 | Shinozaki et al. | 108/20 |
| 2004/0135574 A1* | 7/2004 | Hagio et al. | 324/207.25 |
| 2007/0120555 A1* | 5/2007 | Tokuhara | 324/207.21 |
| 2010/0182762 A1* | 7/2010 | Itomi | 361/807 |
| 2011/0094474 A1* | 4/2011 | Ikeda et al. | 123/403 |
| 2011/0114061 A1* | 5/2011 | Mase | 123/399 |
| 2012/0032670 A1* | 2/2012 | Ikeda et al. | 324/207.25 |
| 2012/0181641 A1 | 7/2012 | Hiramoto et al. | |
| 2013/0132018 A1* | 5/2013 | Kubota et al. | 702/94 |
| 2013/0155562 A1* | 6/2013 | Kubota et al. | 361/91.5 |
| 2013/0249452 A1* | 9/2013 | Shinohara | 318/400.04 |
| 2013/0257232 A1* | 10/2013 | Tomizawa et al. | 310/68 R |

OTHER PUBLICATIONS

Office Action (5 pages), dated Aug. 26, 2014, issued in corresponding Japanese Application No. 2012-234591 and English translation (5 pages).

\* cited by examiner

ROTATION ANGLE DETECTING DEVICE AND ROTARY DRIVE UNIT BY USE THEREOF

CROSS REFERENCE TO RELATED APPLICATION

This application is based on Japanese Patent Application No. 2012-234591 filed on Oct. 24, 2012, the disclosure of which is incorporated herein by reference.

TECHNICAL FIELD

The present disclosure relates to a rotation angle detecting device for detecting a rotation angle of a detection object, and a rotary drive unit using this device.

BACKGROUND

Conventionally, there is known a rotation angle detecting device with two integrated circuits (IC) packages including magnetism detecting elements respectively. In, for example, JP-A-2004-004114, there is described a rotation angle detecting device in which two IC packages are arranged side by side in a board surface direction (see FIG. 6 in JP-A-2004-004114). In this rotation angle detecting device, two magnetism detecting elements are arranged at positions away from a rotation axis of a detection object. Accordingly, by providing a stator having a magnetic collecting effect, deterioration of sensor characteristics is limited.

In the case of the above-described rotation angle detecting device, if the stator is eliminated for the purpose of cost reduction, the sensor characteristics deteriorate, and accuracy in detection of a rotation angle is reduced. In JP-A-2004-004114, it is illustrated that two IC packages are arranged side by side in a board thickness direction (see FIG. 8 in JP-A-2004-004114). By arranging the two IC packages in this manner, the sensor characteristics are good, so that the stator can be eliminated. However, in the example illustrated in FIG. 8 in JP-A-2004-004114, wires for signal output which are connected respectively to the two IC packages are disposed to be adjacent to each other. For this reason, the wires may be short-circuited, such as when conductive foreign substances are attached between the two wires for signal output. If the wires for signal output are short-circuited, signals from the two magnetism detecting elements may be mixed together to be outputted to the outside. As a result, a false detection of the rotation angle may be caused.

SUMMARY

The present disclosure addresses at least one of the above issues.

According to the present disclosure, there is provided a rotation angle detecting device for detecting a rotation angle of a detection object. The device includes a plate-shaped first integrated circuit (IC) package, a plate-shaped second IC package, a power source wire, a ground wire, a first signal output wire, and a second signal output wire. The first IC package is disposed near a rotation axis of the detection object to be rotatable relative to the detection object, and includes a first magnetism detecting element configured to output a signal in accordance with intensity of a magnetic field therearound. The second IC package is provided to be stacked with the first IC package in a thickness direction thereof, and includes a second magnetism detecting element configured to output a signal in accordance with intensity of a magnetic field therearound. The power source wire includes a first power source part and a second power source part on one end side of the power source wire, and a power supply terminal on the other end side of the power source wire. The first power source part is connected to a power source part of the first IC package. The second power source part is connected to a power source part of the second IC package. The power supply terminal is connected to an external power source. The ground wire includes a first ground part and a second ground part on one end side of the ground wire, and a ground terminal on the other end side of the ground wire. The first ground part is connected to a ground part of the first IC package. The second ground part is connected to a ground part of the second IC package. The ground terminal is connected to an external ground. The first signal output wire includes a first signal output part at one end of the first signal output wire and a first signal output terminal at the other end of the first signal output wire. The first signal output part is connected to a signal output part of the first IC package. The signal from the first magnetism detecting element is outputted to the signal output part of the first IC package. The first signal output terminal is configured to output the signal from the first magnetism detecting element to outside. The second signal output wire includes a second signal output part at one end of the second signal output wire and a second signal output terminal at the other end of the second signal output wire. The second signal output part is connected to a signal output part of the second IC package. The signal from the second magnetism detecting element is outputted to the signal output part of the second IC package. The second signal output terminal is configured to output the signal from the second magnetism detecting element to the outside. The power source wire, the ground wire, the first signal output wire, and the second signal output wire are arranged such that at least one of the power supply terminal and the ground terminal is located between the first signal output terminal and the second signal output terminal.

As above, the first IC package and the second IC package are arranged to be stacked with each other in their thickness direction. Accordingly, the first magnetism detecting element and the second magnetism detecting element can be arranged near the rotation axis of the detection object. For this reason, sensor characteristics improve, and accuracy in detection of the rotation angle of the detection object can be increased. Furthermore, a magnetic collecting member such as a stator is not required, so that manufacturing costs can be reduced. In addition, the first signal output terminal and the second signal output terminal are arranged to be spaced away from each other by a predetermined distance. Accordingly, short-circuiting between the first signal output terminal and the second signal output terminal can be limited. As a result, there can be avoided a situation in which the signal from the first magnetism detecting element and the signal from the second magnetism detecting element are mixed together to be outputted to the outside. Therefore, a false detection of the rotation angle of the detection object can be limited.

According to the present disclosure, there is also provided a rotary drive unit including the rotation angle detecting device, a motor, and a motor power source wire. The motor is configured to rotate the detection object. One end of the motor power source wire is connected to the motor. The motor power source wire includes a motor power source terminal at the other end thereof. The motor power source terminal is connected to the external power source. The ground wire and the motor power source wire are arranged such that the ground terminal and the motor power source terminal are adjacent to each other.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
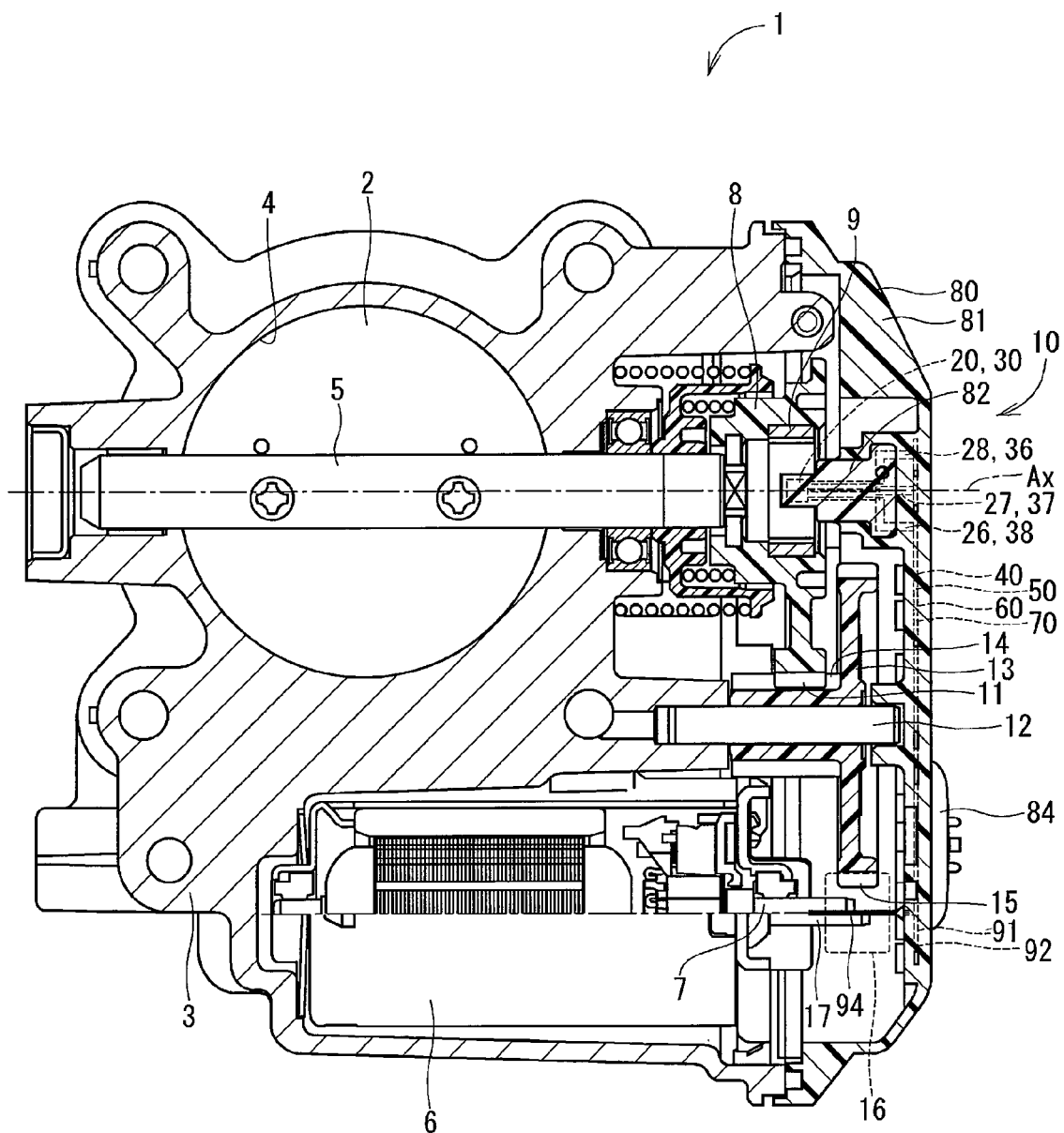
FIG. 1 is a sectional view illustrating a rotation angle detecting device and a rotary drive unit in accordance with a first embodiment.

Rotation angle detecting devices according to embodiments and rotary drive units using these devices will be described below with reference to the drawings. For substantially the same component parts in the embodiments, the same corresponding reference numerals are used to omit their descriptions.

(First Embodiment)

A rotation angle detecting device in a first embodiment and a rotary drive unit to which this device is applied are illustrated in FIG. 1. A rotary drive unit 1 is used for, for example, rotating a throttle valve 2 provided in an intake system of a vehicle. The rotary drive unit 1 includes a housing 3, a valve shaft 5, a motor 6, and a rotation angle detecting device 10.

The housing 3 is formed from metal such as aluminum, and includes therein a passage 4 having a generally cylindrical shape. The passage 4 constitutes an intake passage for guiding intake air into an internal combustion engine. The valve shaft 5 is formed into a rod shape, and is provided to be rotatable relative to the housing 3 such that the shaft 5 is generally perpendicular to a passage axis of the passage 4.

Throttle valve 2 is formed in a shape of a generally circular plate, and is attached to the valve shaft 5 by, for example, a screw member. Accordingly, when the valve shaft 5 rotates, the throttle valve 2 is rotated together with the valve shaft 5 to open or close the passage 4. As a result, the amount of intake air guided into the engine is regulated.

The motor 6 is an electric motor that is rotated upon supply of electric power. In the present embodiment, the motor 6 is, for example, a motor with a brush. The motor 6 includes a motor shaft 7. The rotation, i.e., torque, of the motor 6 is outputted from the motor shaft 7. The motor 6 is accommodated in the housing 3 such that the motor shaft 7 is generally parallel to the valve shaft 5.

At one end of the valve shaft 5, there is provided a cylindrical holder 8 which is formed from, for example, resin. A permanent magnet 9 is provided in the holder 8. Accordingly, the holder 8 and the permanent magnet 9 can rotate together with the valve shaft 5 and the throttle valve 2. The rotation angle detecting device 10 is attached to the housing 3 to cover the one end side of the valve shaft 5, i.e., one end sides of the holder 8, the permanent magnet 9, and the motor shaft 7.

A gear 11 is formed on a part of an outer wall of the holder 8 in its circumferential direction. A rod-shaped shaft 12 is provided for the housing 3 to be generally parallel to the valve shaft 5 and the motor shaft 7. The shaft 12 is provided such that its one end is incapable of rotating relative to the housing 3. The other end of the shaft 12 is supported by a cover 80 of the rotation angle detecting device 10 which will be described in greater detail hereinafter.

A gear member 13 is provided for the shaft 12 to be rotatable relative to the shaft 12. The gear member 13 is formed from, for example, resin, and includes a first gear 14 that can be engaged with the gear 11 of the holder 8. Furthermore, the gear member 13 includes a second gear 15 having a larger outer diameter than the first gear 14. A gear member 16, which can be engaged with the second gear 15 of the gear member 13, is fixed to the one end of the motor shaft 7. The motor 6 includes a power input terminal 17 for electric power supply. Upon supply (input) of electric power to the power input terminal 17, the motor 6 is rotated.

As a result of the above-described configuration, when the motor 6 is rotated, the rotation (torque) of the motor 6 is transmitted to the throttle valve 2 via the motor shaft 7, the gear member 16, the gear member 13, the holder 8, and the valve shaft 5. Accordingly, the throttle valve 2 rotates in the passage 4 to open or close the passage (intake passage) 4. The rotation angle detecting device 10 is provided for detecting a rotation angle of the throttle valve 2. The throttle valve 2 may correspond to a "detection object".

As illustrated in FIGS. 1 to 4, the rotation angle detecting device 10 includes a first IC package 20, a second IC package 30, a power source wire 40, a ground wire 50, a first signal output wire 60, a second signal output wire 70, and the cover 80. The first IC package 20 and second IC package 30 are formed respectively in a plate shape, and are disposed close to a rotation axis Ax of the throttle valve 2 to be rotatable relative to the throttle valve 2. In the present embodiment, as illustrated in FIG. 1, the rotation angle detecting device 10 is attached to the housing 3 such that the first IC package 20 and the second IC package 30 are located inward of the holder 8 and the permanent magnet 9.

Figure 4:
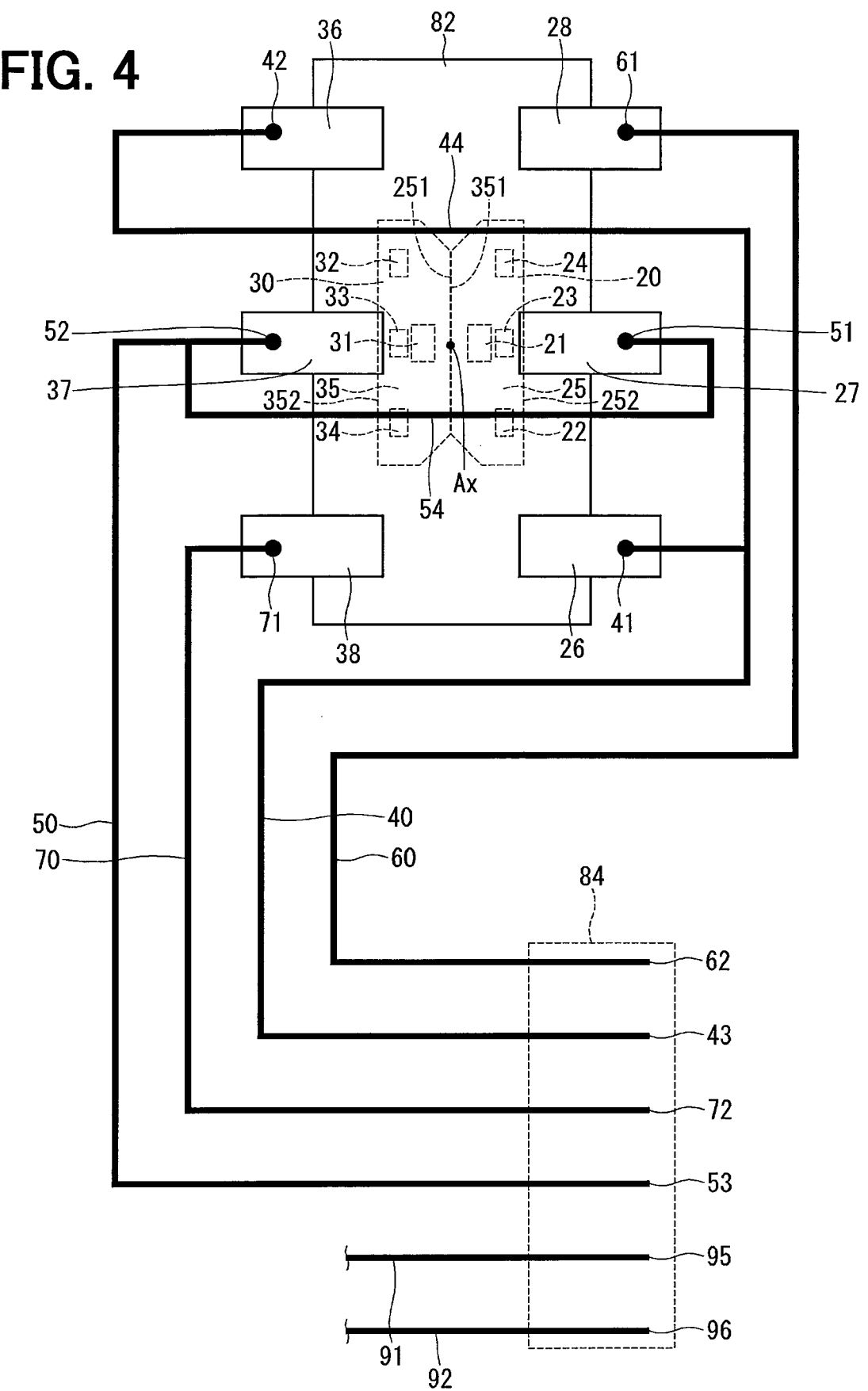
FIG. 4 is schematic view illustrating a configuration of each wire in the rotation angle detecting device and the rotary drive unit of the first embodiment.

As illustrated in FIG. 4, the first IC package 20 includes a first magnetism detecting element 21, a power supply terminal 22, a ground terminal 23, a signal output terminal 24, and a sealing body 25. The first magnetism detecting element 21 outputs a signal that is in accordance with intensity of a magnetic field therearound. The power supply terminal 22, the ground terminal 23, and the signal output terminal 24 are formed in a rod shape from metal having a conductive property, and their respective one ends are connected to the first magnetism detecting element 21 by, for example, wire bonding. The sealing body 25 is formed into a plate shape (hexahedral shape) from, for example, resin, and seals the entire first magnetism detecting element 21, and respective one end sides of the power supply terminal 22, the ground terminal 23, and the signal output terminal 24. The respective other ends of the power supply terminal 22, the ground terminal 23, and the signal output terminal 24 are exposed from the sealing body 25. Both corner parts of one surface 251 of the sealing body 25 are chamfered. In the present embodiment, the first magnetism detecting element 21 is disposed at a position that is shifted from the center of the sealing body 25 toward the one surface 251 by a predetermined distance.

Electric power is supplied to the first magnetism detecting element 21 via the power supply terminal 22 and the ground terminal 23. The signal from the first magnetism detecting element 21 is outputted via the signal output terminal 24. The power supply terminal 22, the ground terminal 23, and the signal output terminal 24 may correspond respectively to "a power source part of the first IC package", "a ground part of the first IC package" and "a signal output part of the first IC package".

The second IC package 30 includes a second magnetism detecting element 31, a power supply terminal 32, a ground terminal 33, a signal output terminal 34, and a sealing body 35. The second magnetism detecting element 31 outputs a signal that is in accordance with intensity of a magnetic field therearound. The power supply terminal 32, the ground terminal 33, and the signal output terminal 34 are formed in a rod shape from metal having a conductive property, and their respective one ends are connected to the second magnetism detecting element 31 by, for example, wire bonding. The sealing body 35 is formed into a plate shape (hexahedral shape) from, for example, resin, and seals the entire second magnetism detecting element 31, and respective one end sides of the power supply terminal 32, the ground terminal 33, and the signal output terminal 34. The respective other ends of the power supply terminal 32, the ground terminal 33, and the signal output terminal 34 are exposed from the sealing body 35. Both corner parts of one surface 351 of the sealing body 35 are chamfered. In the present embodiment, the second magnetism detecting element 31 is disposed at a position that is shifted from the center of the sealing body 35 toward the one surface 351 by a predetermined distance.

Electric power is supplied to the second magnetism detecting element 31 via the power supply terminal 32 and the ground terminal 33. The signal from the second magnetism detecting element 31 is outputted via the signal output terminal 34. The power supply terminal 32, the ground terminal 33, and the signal output terminal 34 may correspond respectively to "a power source part of the second IC package", "a ground part of the second IC package" and "a signal output part of the second IC package".

As illustrated in FIGS. 2A to 4, in the present embodiment, the first IC package 20 and second IC package 30 are arranged to be stacked with each other in their thickness direction. For this reason, both the first magnetism detecting element 21 and the second magnetism detecting element 31 can be arranged near the rotation axis Ax of the throttle valve 2. In the present embodiment, the first IC package 20 and the second IC package 30 are arranged such that the one surface 251 and the one surface 351 are in contact. Accordingly, both the first magnetism detecting element 21 and the second magnetism detecting element 31 can be placed at a position that is closer to the rotation axis Ax.

Figure 3:
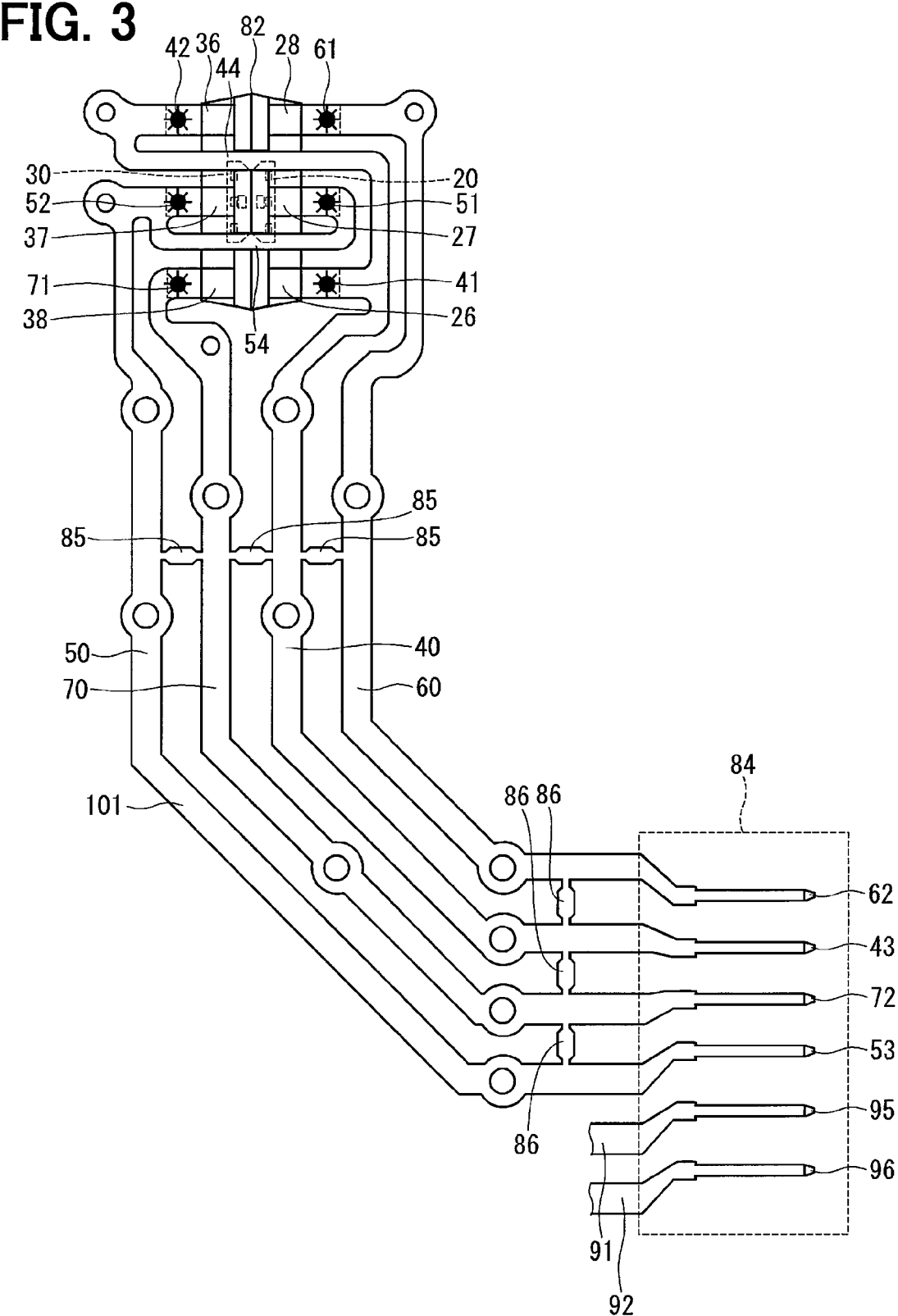
FIG. 3 is a diagram illustrating the part of the member in the production process of the rotation angle detecting device and the rotary drive unit of the first embodiment.

As illustrated in FIGS. 3 and 4, the power source wire 40 is formed in an elongated plate shape from metal having a conductive property such as copper. The power source wire 40 includes a first power source part 41 and a second power source part 42 at its one end. The first power source part 41 is electrically connected to the power supply terminal 22 of the first IC package 20 via a connection piece 26. The second power source part 42 is electrically connected to the power supply terminal 32 of the second IC package 30 via a connection piece 36. The first power source part 41 and the connection piece 26; and the second power source part 42 and the connection piece 36, are joined respectively by, for example, resistance welding. The power source wire 40 includes a power supply terminal 43 at its other end. The power supply terminal 43 is connected to an external power source through a wire harness (not shown).

The ground wire 50 is formed in an elongated plate shape from metal having a conductive property such as copper. The ground wire 50 includes a first ground part 51 and a second ground part 52 at its one end. The first ground part 51 is electrically connected to the ground terminal 23 of the first IC package 20 via a connection piece 27. The second ground part 52 is electrically connected to the ground terminal 33 of the second IC package 30 via a connection piece 37. The first ground part 51 and the connection piece 27; and the second ground part 52 and the connection piece 37, are joined respectively by, for example, resistance welding. The ground wire 50 includes a ground terminal 53 at its other end. The ground terminal 53 is connected to an external ground (earthed) through a wire harness (not shown).

The first signal output wire 60 is formed in an elongated plate shape from metal having a conductive property such as copper. The first signal output wire 60 includes a first signal output part 61 at its one end. The first signal output part 61 is electrically connected to the signal output terminal 24 of the first IC package 20 via a connection piece 28. The first signal output part 61 and the connection piece 28 are joined by, for example, resistance welding. The first signal output wire 60 includes a first signal output terminal 62 at its other end. The first signal output terminal 62 is connected to an electronic control unit (hereinafter referred to as an "ECU") through a wire harness (not shown). Accordingly, the signal from the first magnetism detecting element 21 of the first IC package 20 is outputted to the external ECU. The ECU is a small-sized computer including a central processing unit (CPU) as an operation means, a read only memory (ROM) and a random access memory (RAM) as storage means, and input/output means. Based on, for example, signals from sensors attached to respective parts of the vehicle, the ECU performs processing in accordance with a program stored in the ROM to control, for example, devices at respective parts of the vehicle.

The second signal output wire 70 is formed in an elongated plate shape from metal having a conductive property such as copper. The second signal output wire 70 includes a second signal output part 71 at its one end. The second signal output part 71 is electrically connected to the signal output terminal 34 of the second IC package 30 via a connection piece 38. The second signal output part 71 and the connection piece 38 are joined by, for example, resistance welding. The second signal output wire 70 includes a second signal output terminal 72 at its other end. The second signal output terminal 72 is connected to the ECU through a wire harness (not shown). Accordingly, the signal from the second magnetism detecting element 31 of the second IC package 30 is outputted to the external ECU.

In the present embodiment, as illustrated in FIG. 3, before the first power source part 41, the first ground part 51, the first signal output part 61, the second power source part 42, the second ground part 52, and the second signal output part 71 are joined to the connection pieces 26 to 28, 36 to 38, the power source wire 40, the ground wire 50, the first signal output wire 60 and the second signal output wire 70 are connected to each other by connecting parts 85, 86 to form an intermediate formation body 101. Accordingly, at the time of the above joining, separation of the power source wire 40, the ground wire 50, the first signal output wire 60 and the second signal output wire 70 can be prevented. As a result, the joinings between the first power source part 41, the first ground part 51, the first signal output part 61, the second power source part 42, the second ground part 52, and the second signal output part 71; and the connection pieces 26 to 28, 36 to 38 can be stably carried out. After the joinings, the connecting parts 85, 86 are removed from the intermediate formation body 101.

In the present embodiment, the rotary drive unit 1 further includes motor power source wires 91, 92. The motor power source wires 91, 92 are formed in an elongated plate shape from metal having a conductive property such as copper. Respective one ends 93, 94 of the motor power source wires 91, 92 are electrically connected to the power input terminal 17 of the motor 6 (see FIG. 1). The motor power source wires 91, 92 include motor power source terminals 95, 96 at their respective other ends (see FIGS. 2A to 4). The motor power source terminals 95, 96 are connected to an external power source through a wire harness (not shown).

Figure 2A:
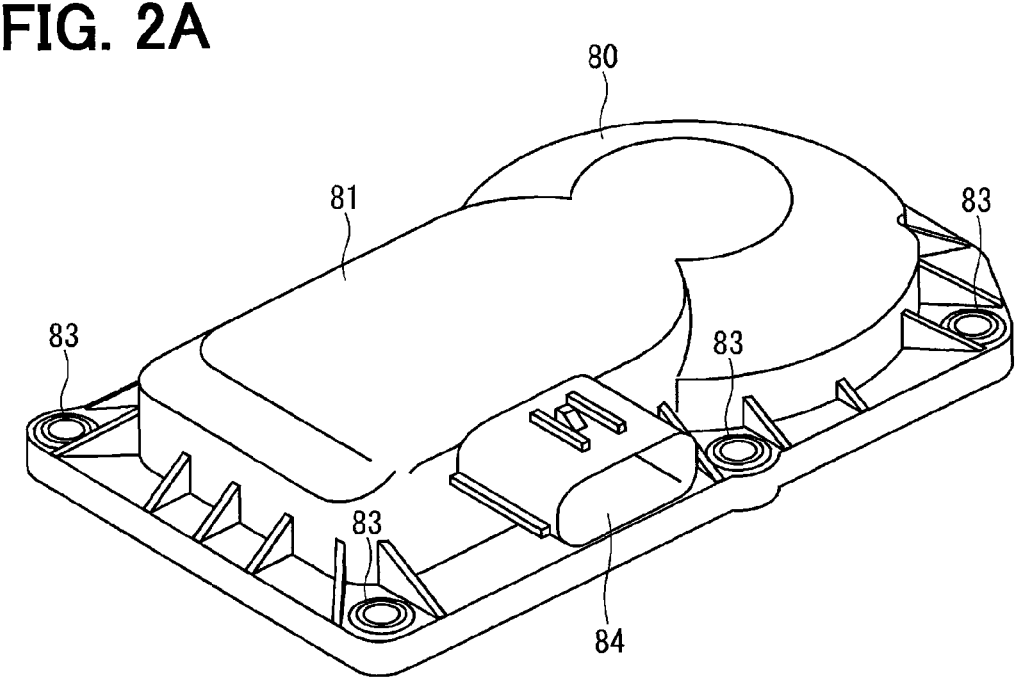
FIG. 2A is a perspective view illustrating the rotation angle detecting device of the first embodiment.
Figure 2B:
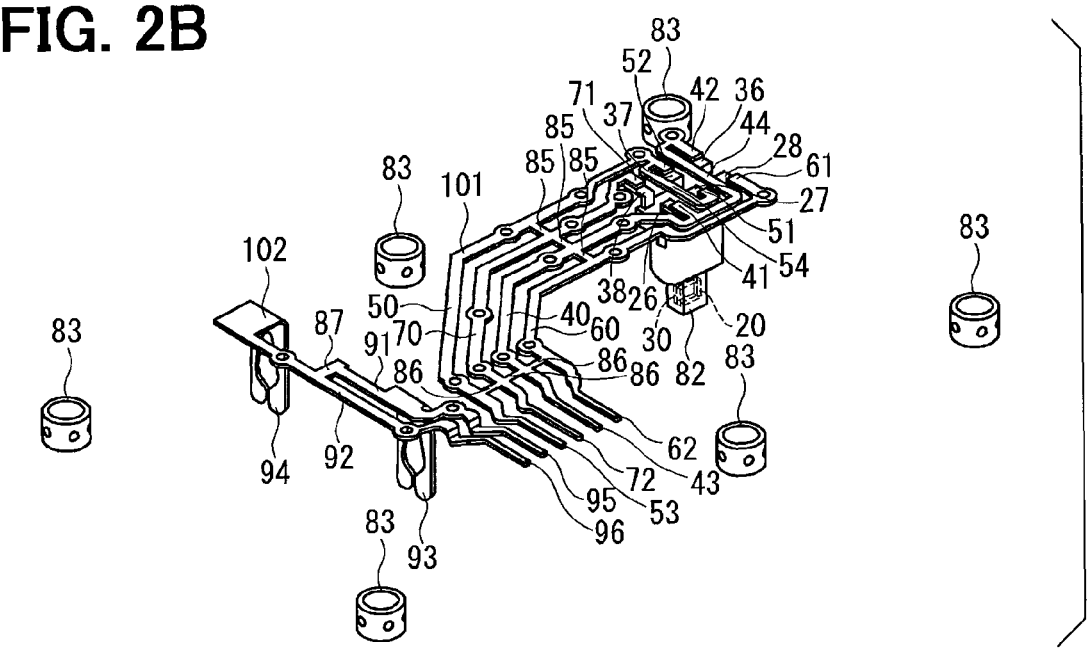
FIG. 2B is a perspective view illustrating a part of a member in a production process of the rotation angle detecting device and the rotary drive unit of the first embodiment.

As illustrated in FIGS. 2A and 2B, the cover 80 includes a cover main body 81, a primary formed body 82, and a cylindrical member 83. The cover main body 81 is formed in a dish shape from, for example, resin. The cover main body 81 includes a cylindrical connector portion 84. As illustrated in FIGS. 1, 2B, 3, and 4, the primary formed body 82 is formed from, for example, resin to cover all of the first IC package 20 and the second IC package 30, end portions of the connection pieces 26 to 28 on the first IC package 20-side, and end portions of the connection pieces 36 to 38 on the second IC package 30-side. Therefore, the first IC package 20, the second IC package 30, and the connection pieces 26 to 28, 36 to 38 are insert-molded in the primary formed body 82.

As illustrated in FIG. 1, the primary formed body 82 covering the first IC package 20, the second IC package 30, the connection pieces 26 to 28, and the connection pieces 36 to 38; the power source wire 40, the ground wire 50, the first signal output wire 60 and the second signal output wire 70 which are connected to the connection pieces 26 to 28, 36 to 38; and the motor power source wires 91, 92 are insert-molded in the cover main body 81. Six cylindrical members 83 in total are insert-molded in an outer rim part of the cover main body 81. The cover 80 is attached to the housing 3 by passing a fastening member such as a bolt through the cylindrical member 83.

The primary formed body 82 is insert-molded in the cover main body 81 such that a part of the primary formed body 82 that covers the first IC package 20 and the second IC package 30 is exposed to an opening side of the dish-shaped cover main body 81. The power source wire 40, the ground wire 50, the first signal output wire 60, the second signal output wire 70, and the motor power source wires 91, 92 are insert-molded in the cover main body 81 such that the power supply terminal 43, the ground terminal 53, the first signal output terminal 62, the second signal output terminal 72, and the motor power source terminals 95, 96 are exposed to the inside of the cylindrical connector portion 84.

One end of a wire harness (not shown) is connected to the connector portion 84. The other end of this wire harness is connected to a power source and ECU (not shown). As a result of this configuration, electric power is supplied from the power source to the motor 6, the first IC package 20, and the second IC package 30 via the wire harness; and the signal relevant to the rotation angle of the throttle valve 2 is outputted from the rotation angle detecting device 10 to the ECU through the wire harness. Accordingly, the ECU can calculate an opening degree of the throttle valve 2.

As illustrated in FIG. 4, in the present embodiment, the power source wire 40, the ground wire 50, the first signal output wire 60 and the second signal output wire 70 are arranged such that the power supply terminal 43 is located between the first signal output terminal 62 and the second signal output terminal 72. Thus, the first signal output terminal 62 (first signal output wire 60) and the second signal output terminal 72 (second signal output wire 70) are arranged to be away from each other by a predetermined distance. Accordingly, short-circuiting between the first signal output terminal 62 (first signal output wire 60) and the second signal output terminal 72 (second signal output wire 70) due to, for example, attachment of conductive foreign substances can be limited.

In the present embodiment, the power source wire 40 includes an intermediate wiring part 44 which is formed to pass between the second power source part 42 and the second ground part 52, and between the first signal output part 61 and the first ground part 51. In the present embodiment, the ground wire 50 includes a bypass wiring part 54 which is formed to bypass a portion between the first ground part 51 and the second ground part 52.

As illustrated in FIG. 3, in the present embodiment, the first power source part 41, the second power source part 42, the first ground part 51, the second ground part 52, the first signal output part 61, and the second signal output part 71 are formed into the same shape. In the present embodiment, the ground wire 50 and the motor power source wires 91, 92 are arranged such that the ground terminal 53 and the motor power source terminals 95, 96 are adjacent to each other. Therefore, the ground terminal 53 (ground wire 50) is provided close to the motor power source terminals 95, 96 (motor power source wires 91, 92).

In the present embodiment, the power source wire 40, the ground wire 50, the first signal output wire 60, the second signal output wire 70, and the motor power source wires 91, 92 are arranged such that the second signal output terminal 72 and the ground terminal 53 are located between the first signal output terminal 62 and the power supply terminal 43; and the motor power source terminals 95, 96. Thus, the first signal output terminal 62 (first signal output wire 60) and the power supply terminal 43 (power source wire 40); and the motor power source terminals 95, 96 (motor power source wires 91, 92) are provided to be away from each other by a predetermined distance. As described above, in the present embodiment, the power source wire 40, the ground wire 50, the first signal output wire 60, the second signal output wire 70, and the motor power source wires 91, 92 are provided such that the first signal output terminal 62, the power supply terminal 43, the second signal output terminal 72, the ground terminal 53, and the motor power source terminals 95, 96 are arranged in this order in the connector portion 84.

Next, a production method for the rotation angle detecting device 10 of the present embodiment will be described. The production method of the rotation angle detecting device 10 includes the following processes.

An IC package terminal joining process will be described below. The power supply terminal 22, the ground terminal 23, and the signal output terminal 24 of the first IC package 20; and the connection pieces 26, 27, 28 are joined by, for example, resistance welding. Also, the power supply terminal 32, the ground terminal 33, and the signal output terminal 34 of the second IC package 30; and the connection pieces 36, 37, 38 are joined by, for example, resistance welding.

A primary forming process will be described below. After the above-described process, insert-molding is carried out to cover all of the first IC package 20 and the second IC package 30, end portions of the connection pieces 26 to 28 on the first IC package 20-side, and end portions of the connection pieces 36 to 38 on the second IC package 30-side by the primary formed body 82. At this time, the first IC package 20 and the second IC package 30 are insert-molded with the one surface 251 and the one surface 351 in contact.

A wiring formation process will be described below. As illustrated in FIGS. 2A and 3, by for example, punching out one sheet of a metal plate having a conductive property such as copper, there is formed the intermediate formation body 101 with the power source wire 40, the ground wire 50, the first signal output wire 60 and the second signal output wire 70 connected by the connecting parts 85, 86. As illustrated in FIG. 2B, by for example, punching out one sheet of a metal plate having a conductive property such as copper, there is formed an intermediate formation body 102 with the motor power source wires 91 and the motor power source wires 92 connected by a connecting part 87.

A wire joining process will be described below. The first power source part 41 of the power source wire 40, the first ground part 51 of the ground wire 50, the first signal output part 61 of the first signal output wire 60, the second power source part 42 of the power source wire 40, the second ground part 52 of the ground wire 50, and the second signal output part 71 of the second signal output wire 70; and the connection pieces 26 to 28, 36 to 38 are joined by, for example, resistance welding. A connecting part removing process will be described below. After the above-described process, the connecting parts 85, 86 are removed from the intermediate formation body 101. Also, the connecting part 87 is removed from the intermediate formation body 102.

A secondary forming process will be described below. After the above-described process, insert-molding is performed to cover the primary formed body 82, the power source wire 40, the ground wire 50, the first signal output wire 60, the second signal output wire 70, the motor power source wires 91, 92, and the cylindrical member 83 by the cover main body 81.

Operations of the rotation angle detecting device 10 and the rotary drive unit 1 will be described. When an ignition switch is turned on, for example, electric power is supplied from the power source to the first IC package 20 and the second IC package 30 of the rotation angle detecting device 10 via the wire harness and the power source wire 40 (power supply terminal 43). The rotation angle detecting device 10 outputs the signal that is in accordance with the rotation angle of the throttle valve 2 to the ECU. Based on the signal from the rotation angle detecting device 10, the ECU calculates the rotation angle of the throttle valve 2. Normally, the ECU calculates the rotation angle of the throttle valve 2 based on a signal from the first IC package 20. If the first IC package 20 functions abnormally, the ECU calculates the rotation angle of the throttle valve 2 based on a signal from the second IC package 30.

The ECU calculates the target amount of fuel and intake air supplied to the engine based on an opening degree signal of an accelerator pedal (not shown), a loaded condition of the engine and so forth. In accordance with the calculated target amount of fuel and intake air supplied, the ECU injects and supplies fuel into the engine, and controls electric power supplied from the power source to the motor 6 of the rotary drive unit 1 through the wire harness and the motor power source wires 91, 92 (motor power source terminals 95, 96). Accordingly, the motor 6 is rotated, so that the opening degree (rotation angle) of the throttle valve 2 is changed. As a result, the amount of intake air supplied to the engine is changed.

As described above, in the present embodiment, the first IC package 20 is formed in a plate shape, and is disposed close to the rotation axis Ax of the throttle valve 2 to be rotatable relative to the throttle valve 2. The first IC package 20 includes the first magnetism detecting element 21 that outputs the signal which is in accordance with intensity of a magnetic field therearound. The second IC package 30 is formed in a plate shape, and is provided to be stacked with the first IC package 20 in the thickness direction. The second IC package 30 includes the second magnetism detecting element 31 that outputs the signal which is in accordance with intensity of a magnetic field therearound. As above, the first IC package 20 and second IC package 30 are arranged to be stacked with each other in their thickness direction. Accordingly, the first magnetism detecting element 21 and the second magnetism detecting element 31 can be arranged near the rotation axis Ax of the throttle valve 2. For this reason, sensor characteristics improve, and accuracy in detection of the rotation angle of the throttle valve 2 can be increased. Furthermore, a magnetic collecting member such as a stator is not required, so that manufacturing costs can be reduced.

The power source wire 40 includes at its one end the first power source part 41 which is connected to the power supply terminal 22 of the first IC package 20, and the second power source part 42 which is connected to the power supply terminal 32 of the second IC package 30. The power source wire 40 includes the power supply terminal 43 which is connected to the external power source at its other end. The ground wire 50 includes at its one end the first ground part 51 which is connected to the ground terminal 23 of the first IC package 20, and the second ground part 52 which is connected to the ground terminal 33 of the second IC package 30. The ground wire 50 includes at its other end the ground terminal 53 which is connected to the external ground.

The first signal output wire 60 includes at its one end the first signal output part 61 which is connected to the signal output terminal 24 of the first IC package 20, from which the signal from the first magnetism detecting element 21 is outputted. The first signal output wire 60 includes at its other end the first signal output terminal 62 for outputting the signal from the first magnetism detecting element 21 to the outside. The second signal output wire 70 includes at its one end the second signal output part 71 which is connected to the signal output terminal 34 of the second IC package 30 from which the signal from the second magnetism detecting element 31 is outputted. The second signal output wire 70 includes at its other end the second signal output terminal 72 for outputting the signal from the second magnetism detecting element 31 to the outside.

In the present embodiment, the power source wire 40, the ground wire 50, the first signal output wire 60 and the second signal output wire 70 are provided such that the power supply terminal 43 is located between the first signal output terminal 62 and the second signal output terminal 72. Thus, the first signal output terminal 62 (first signal output wire 60) and the second signal output terminal 72 (second signal output wire 70) are arranged to be away from each other by a predetermined distance. Accordingly, short-circuiting between the first signal output terminal 62 and the second signal output terminal 72 can be limited. As a result, there can be avoided a situation in which the signal from the first magnetism detecting element 21 and the signal from the second magnetism detecting element 31 are mixed together to be outputted to the outside. Therefore, a false detection of the rotation angle of the throttle valve 2 can be limited.

In the present embodiment, the power source wire 40 includes an intermediate wiring part 44 which is formed to pass between the second power source part 42 and the second ground part 52, and between the first signal output part 61 and the first ground part 51. Accordingly, the above-described arrangement of the power source wire 40, the ground wire 50, the first signal output wire 60 and the second signal output wire 70 is made possible. In the present embodiment, the ground wire 50 includes a bypass wiring part 54 which is formed to bypass a portion between the first ground part 51 and the second ground part 52. Accordingly, even if heat is applied to vicinity of the first ground part 51 and the second ground part 52, stresses produced at a joining part between the first ground part 51 and the connection piece 27, and at a joining part between the second ground part 52 and the connection piece 37 can be reduced as a result of thermal expansion of the bypass wiring part 54. For this reason, as compared to a case where the first ground part 51 and the second ground part 52 are formed to be linearly connected, defective joining at the above-described joining parts can be limited.

In the present embodiment, the first power source part 41, the second power source part 42, the first ground part 51, the second ground part 52, the first signal output part 61, and the second signal output part 71 are formed into the same shape. Accordingly, when respectively joining the first power source part 41 and the connection piece 26; the second power source part 42 and the connection piece 36; the first ground part 51 and the connection piece 27; the second ground part 52 and the connection piece 37; the first signal output part 61 and the connection piece 28; and the second signal output part 71 and the connection piece 38 by, for example, a welding equipment, they can be joined together without changing a direction of a welding part of the welding equipment. Thus, efficiency of the joining process can be improved.

In the present embodiment, the rotary drive unit 1 includes the rotation angle detecting device 10, the motor 6 that rotates the throttle valve 2, and the motor power source wires 91, 92 whose one ends are connected to the motor 6 and whose other ends include the motor power source terminals 95, 96 that are connected to the external power source. The ground wire 50, and the motor power source wires 91, 92 are arranged so that the ground terminal 53 and the motor power source terminals 95, 96 are adjacent to each other. Therefore, the ground terminal 53 (ground wire 50) is provided close to the motor power source terminals 95, 96 (motor power source wires 91, 92). Accordingly, power supply noise generated from the motor power source terminals 95, 96 (motor power source wires 91, 92) can be reduced.

In the present embodiment, the power source wire 40, the ground wire 50, the first signal output wire 60, the second signal output wire 70, and the motor power source wires 91, 92 are arranged such that the second signal output terminal 72 and the ground terminal 53 are located between the first signal output terminal 62 and the power supply terminal 43; and the motor power source terminals 95, 96. Thus, the first signal output terminal 62 (first signal output wire 60) and the power supply terminal 43 (power source wire 40); and the motor power source terminals 95, 96 (motor power source wires 91, 92) are provided to be away from each other by a predetermined distance. By arranging the first signal output terminal 62 (first signal output wire 60) and the power supply terminal 43 (power source wire 40) with a predetermined distance maintained from the motor power source terminals 95, 96 (motor power source wires 91, 92), mixing of the power supply noise generated from the motor power source terminals 95, 96 (motor power source wires 91, 92) into the signals flowing through the first signal output terminal 62 (first signal output wire 60) and the power supply terminal 43 (power source wire 40) can be limited.

As described above, in the rotary drive unit 1 and the rotation angle detecting device 10 of the present embodiment, with the manufacturing costs lowered by reducing a magnetic collecting member such as a stator, the following basic design concepts 1 to 3 can be achieved with respect to the arrangement of the terminals in the connector portion 84 (the power supply terminal 43, the ground terminal 53, the first signal output terminal 62, the second signal output terminal 72, and the motor power source terminals 95, 96). The basic design concepts of the connector terminal arrangement: (1) The signal wires (the first signal output terminal 62, the second signal output terminal 72) are not adjacently arranged. (2) For a measure against the motor power source noise, the ground terminal 53 is disposed near the motor power source terminals 95, 96. (3) Because they are important terminals through which important signals flow, the first signal output terminal 62 and the power supply terminal 43 are spaced away from the motor power source terminals 95, 96 by a predetermined distance.

(Second Embodiment)

Figure 5:
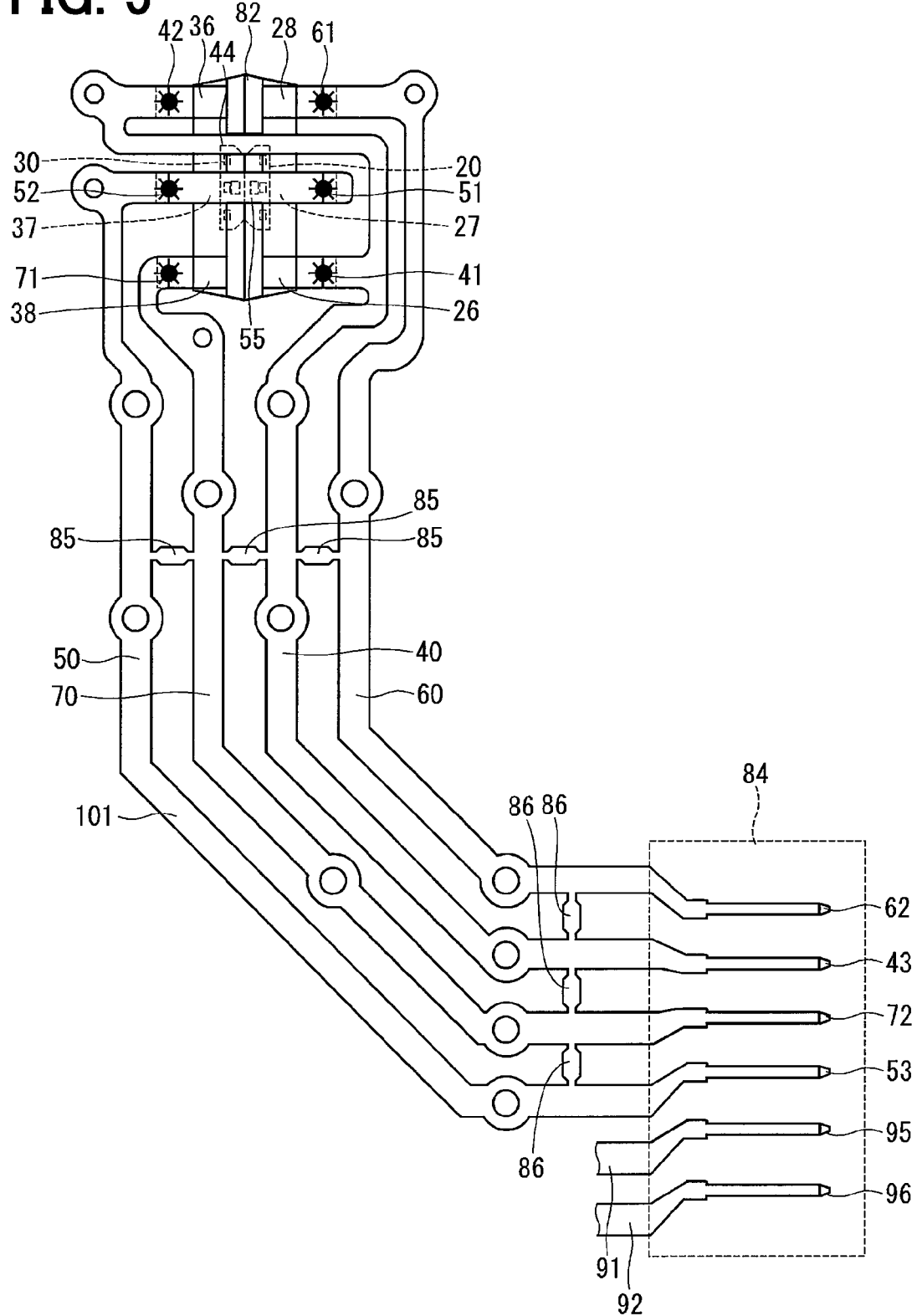
FIG. 5 is a diagram illustrating a part of a member in a production process of a rotation angle detecting device and a rotary drive unit of a second embodiment.
Figure 6:
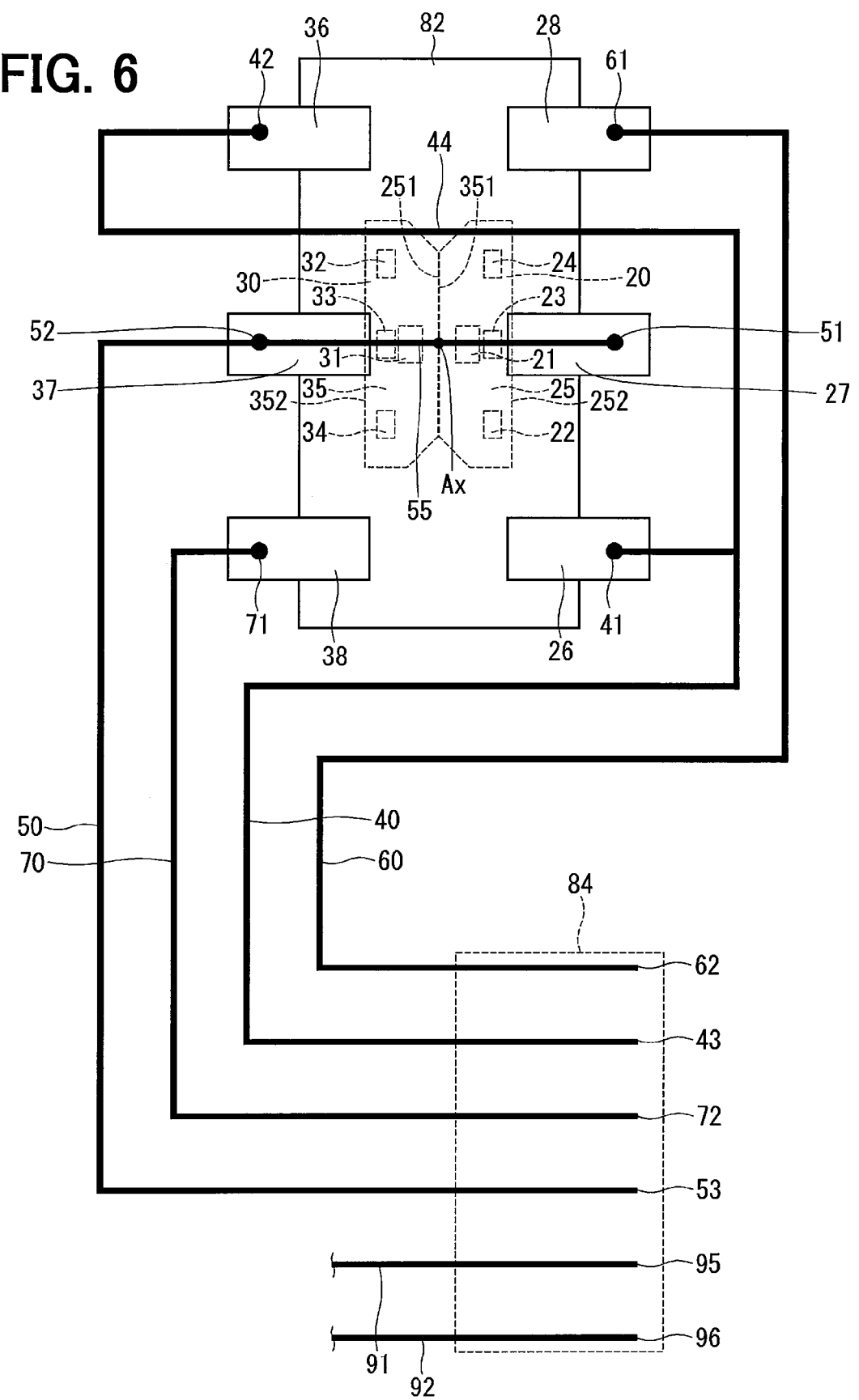
FIG. 6 is a schematic view illustrating a configuration of each wire in the rotation angle detecting device and the rotary drive unit of the second embodiment.

A rotary drive unit and a rotation angle detecting device in a second embodiment are partially illustrated in FIGS. 5 and 6. The second embodiment is different from the first embodiment in shape of a ground wire of the rotation angle detecting device.

In the second embodiment, a ground wire 50 includes a linear connecting part 55 instead of the bypass wiring part 54 of the first embodiment. The linear connecting part 55 is linearly formed to connect together a first ground part 51 and a second ground part 52. Accordingly, the first ground part 51 and the second ground part 52 are linearly connected. Configurations of the second embodiment other than the above-described respect are similar to the first embodiment.

As described above, in the present embodiment, the first ground part 51 and the second ground part 52 are connected by the linear connecting part 55. Accordingly, if heat is applied to vicinity of the first ground part 51 and the second ground part 52, because of thermal expansion of the linear connecting part 55, stresses produced at a joining part between the first ground part 51 and a connection piece 27 and at a joining part between the second ground part 52 and a connection piece 37 may be larger than the first embodiment. However, in the configuration of the second embodiment as well, similar to the first embodiment, the above basic design concepts 1 to 3 can be achieved with respect to the arrangement of terminals in a connector portion 84 (a power supply terminal 43, a ground terminal 53, a first signal output terminal 62, a second signal output terminal 72, and motor power source terminals 95, 96).

(Third Embodiment)

Figure 7:
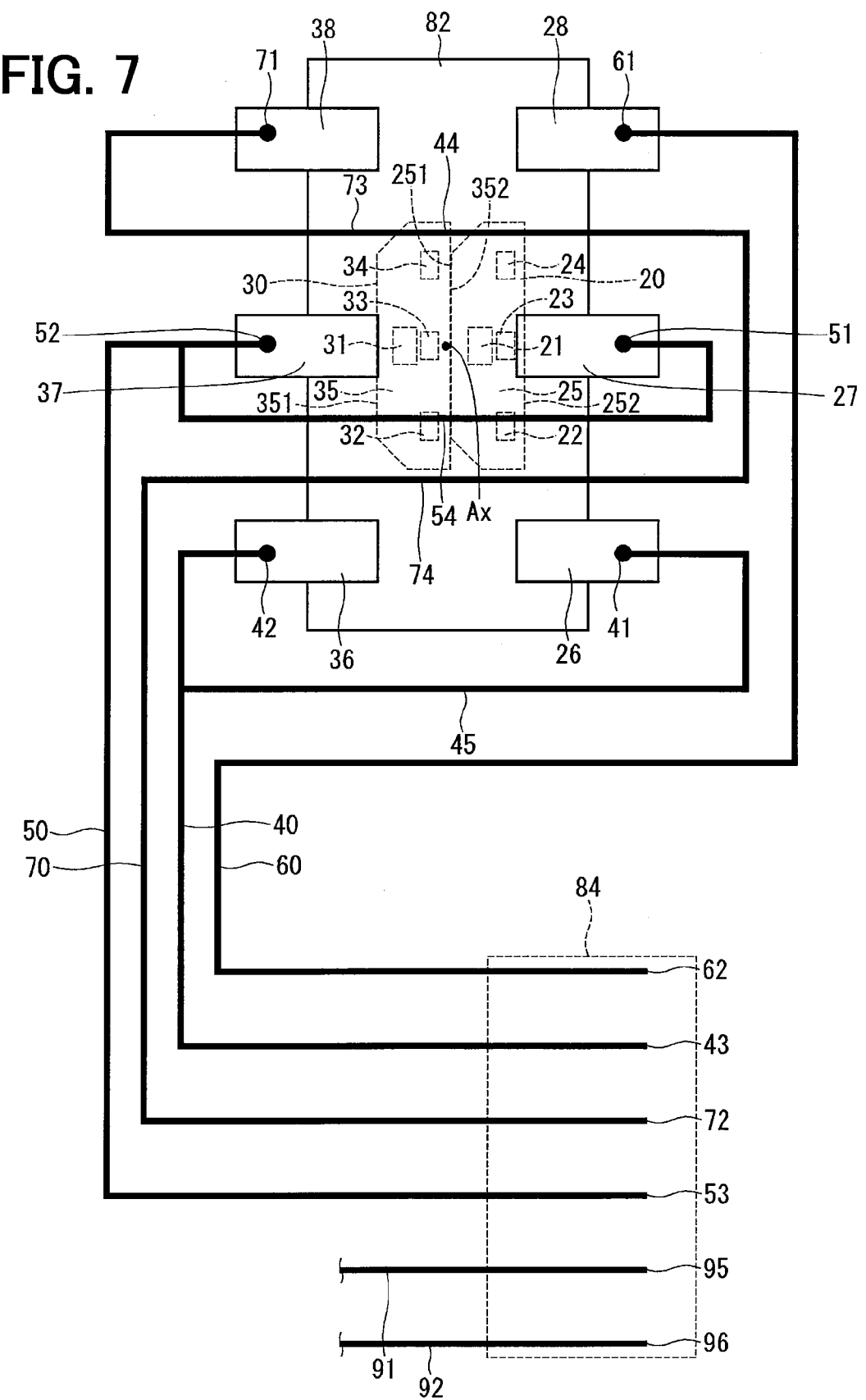
FIG. 7 is a schematic view illustrating a configuration of each wire in a rotation angle detecting device and a rotary drive unit in accordance with a third embodiment.

A rotary drive unit and a rotation angle detecting device in a third embodiment are partially illustrated in FIG. 7. The third embodiment is different from the first embodiment in arrangement of a first IC package and a second IC package, shapes and arrangement of wires, and so forth.

In the third embodiment, a first IC package 20 and a second IC package 30 are insert-molded by a primary formed body 82 with one surface 251 of a sealing body 25 in the first IC package 20 and the other surface 352 of a sealing body 35 in the second IC package 30 in contact. Accordingly, as compared to the first embodiment and the second embodiment, distances to a first magnetism detecting element 21 and a second magnetism detecting element 31 from the rotation axis Ax are long. Nevertheless, both the first magnetism detecting element 21 and the second magnetism detecting element 31 can be arranged at positions relatively close to the rotation axis Ax.

In the present embodiment, the positions of connection pieces 36, 38 relative to the primary formed body 82 are different from the first embodiment. In the present embodiment, the connection piece 36 is disposed at a position opposed to a connection piece 26. The connection piece 38 is disposed at a position opposed to a connection piece 28. In the present embodiment, similar to the first embodiment, a power source wire 40, a ground wire 50, a first signal output wire 60, a second signal output wire 70, and motor power source wires 91, 92 are provided such that a first signal output terminal 62, a power supply terminal 43, a second signal output terminal 72, a ground terminal 53, and motor power source terminals 95, 96 are arranged in this order in a connector portion 84.

In the present embodiment, the second signal output wire 70 includes intermediate wiring parts 73, 74. The intermediate wiring part 73 is formed to pass between a second signal output part 71 and a second ground part 52; and between a first signal output part 61 and a first ground part 51. The intermediate wiring part 74 is formed to pass between the first ground part 51 and a first power source part 41; and between the second ground part 52 and a second power source part 42. In the present embodiment, the power source wire 40 includes a bypass wiring part 45 which is formed to bypass a portion between the first power source part 41 and the second power source part 42.

As described above, in the present embodiment, surfaces (direction) on which the first IC package 20 and the second IC package 30 are in contact are different. Nonetheless, similar to the first embodiment, the power source wire 40, the ground wire 50, the first signal output wire 60, the second signal output wire 70, and the motor power source wires 91, 92 are provided such that the first signal output terminal 62, the power supply terminal 43, the second signal output terminal 72, the ground terminal 53, and the motor power source terminals 95, 96 are arranged in this order in the connector portion 84. Accordingly, similar to the first embodiment, with the manufacturing costs lowered by reducing a magnetic collecting member such as a stator, the above-described basic design concepts 1 to 3 can be achieved with respect to the arrangement of terminals in the connector portion 84. In addition, since the power source wire 40 includes the bypass wiring part 45, even if heat is applied to vicinity of the first power source part 41 and the second power source part 42, there can be reduced stresses produced at a joining part between the first power source part 41 and the connection piece 26, and at a joining part between the second power source part 42 and the connection piece 36.

Modifications of the above embodiments will be described. In the above embodiments, it is illustrated that the power source wire, the ground wire, the first signal output wire, and the second signal output wire are arranged such that only the power supply terminal is located between the first signal output terminal and the second signal output terminal. In a modification of the embodiments, the power source wire, the ground wire, the first signal output wire, and the second signal output wire may be provided in any arrangement as long as at least one of the power supply terminal and the ground terminal is located between the first signal output terminal and the second signal output terminal.

In the above embodiments, it is illustrated that the power source wire or the second signal output wire includes the intermediate wiring part. In a modification of the embodiments, the ground wire or the first signal output wire, as well as the power source wire and the second signal output wire, may include an intermediate wiring part. In the above-described first and third embodiments, it is illustrated that the power source wire and the ground wire include the bypass wiring parts. In a modification of the embodiments, at least one of the power source wire and the ground wire may include the linear connecting part as described in the second embodiment, instead of the bypass wiring part.

In the above embodiments, it is illustrated that the first power source part, the second power source part, the first ground part, the second ground part, the first signal output part, and the second signal output part are formed in the same shape. In a modification of the embodiments, the first power source part, the second power source part, the first ground part, the second ground part, the first signal output part, and the second signal output part may be formed respectively in different shapes. In a modification of the embodiments, the rotation angle detecting device does not necessarily include the motor power source terminals inside the connector portion of the cover main body. Thus, the rotation angle detecting device and the rotary drive unit may be configured independently of each other. In a modification of the embodiments, the corner parts of the sealing bodies of the first IC package and the second IC package are not necessarily chamfered.

The rotary drive unit of the present disclosure can be used not only for the drive of the throttle valve, but also for drive of other devices or apparatuses such as an exhaust gas recirculation (EGR) valve. The rotation angle detecting device of the present disclosure can be used not only for the detection of the rotation angle of the throttle valve but also for detection of a rotation angle of another rotatable member such as an accelerator pedal. In this manner, the present disclosure is not limited to the above-described embodiments, and can be embodied in various modes without departing from the scope of the disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A rotation angle detecting device for detecting a rotation angle of a detection object, the device comprising:
a plate-shaped first integrated circuit (IC) package that is disposed near a rotation axis of the detection object to be rotatable relative to the detection object and that includes a first magnetism detecting element configured to output a signal in accordance with intensity of a magnetic field therearound;
a plate-shaped second IC package that is provided to be stacked with the first IC package in a thickness direction thereof and that includes a second magnetism detecting element configured to output a signal in accordance with intensity of a magnetic field therearound;
a power source wire that includes a first power source part and a second power source part on one end side of the power source wire, and a power supply terminal on the other end side of the power source wire, wherein:
the first power source part is connected to a power source part of the first IC package;
the second power source part is connected to a power source part of the second IC package; and
the power supply terminal is connected to an external power source;
a ground wire that includes a first ground part and a second ground part on one end side of the ground wire, and a ground terminal on the other end side of the ground wire, wherein:
the first ground part is connected to a ground part of the first IC package;

the second ground part is connected to a ground part of the second IC package; and
the ground terminal is connected to an external ground;
a first signal output wire that includes a first signal output part at one end of the first signal output wire and a first signal output terminal at the other end of the first signal output wire, wherein:
the first signal output part is connected to a signal output part of the first IC package;
the signal from the first magnetism detecting element is outputted to the signal output part of the first IC package; and
the first signal output terminal is configured to output the signal from the first magnetism detecting element to outside; and
a second signal output wire that includes a second signal output part at one end of the second signal output wire and a second signal output terminal at the other end of the second signal output wire, wherein:
the second signal output part is connected to a signal output part of the second IC package;
the signal from the second magnetism detecting element is outputted to the signal output part of the second IC package;
the second signal output terminal is configured to output the signal from the second magnetism detecting element to the outside;
the power source wire, the ground wire, the first signal output wire, and the second signal output wire are arranged such that at least one of the power supply terminal and the ground terminal is located between the first signal output terminal and the second signal output terminal;
at least one of the power source wire, the ground wire, the first signal output wire, and the second signal output wire includes an intermediate wiring part that is formed to pass between the first power source part, the second power source part, the first ground part, the second ground part, the first signal output part, and the second signal output part; and
the at least one of the power source wire, the ground wire, the first signal output wire, and the second signal output wire includes the intermediate wiring part as a part thereof.

2. A rotation angle detecting device for detecting a rotation angle of a detection object, the device comprising:
a plate-shaped first integrated circuit (IC) package that is disposed near a rotation axis of the detection object to be rotatable relative to the detection object and that includes a first magnetism detecting element configured to output a signal in accordance with intensity of a magnetic field therearound;
a plate-shaped second IC package that is provided to be stacked with the first IC package in a thickness direction thereof and that includes a second magnetism detecting element configured to output a signal in accordance with intensity of a magnetic field therearound;
a power source wire that includes a first power source part and a second power source part on one end side of the power source wire, and a power supply terminal on the other end side of the power source wire, wherein:
the first power source part is connected to a power source part of the first IC package;
the second power source part is connected to a power source part of the second IC package; and
the power supply terminal is connected to an external power source;
a ground wire that includes a first ground part and a second ground part on one end side of the ground wire, and a ground terminal on the other end side of the ground wire, wherein:
the first ground part is connected to a ground part of the first IC package;
the second ground part is connected to a ground part of the second IC package; and
the ground terminal is connected to an external ground;
a first signal output wire that includes a first signal output part at one end of the first signal output wire and a first signal output terminal at the other end of the first signal output wire, wherein:
the first signal output part is connected to a signal output part of the first IC package;
the signal from the first magnetism detecting element is outputted to the signal output part of the first IC package; and
the first signal output terminal is configured to output the signal from the first magnetism detecting element to outside; and
a second signal output wire that includes a second signal output part at one end of the second signal output wire and a second signal output terminal at the other end of the second signal output wire, wherein:
the second signal output part is connected to a signal output part of the second IC package;
the signal from the second magnetism detecting element is outputted to the signal output part of the second IC package;
the second signal output terminal is configured to output the signal from the second magnetism detecting element to the outside;
the power source wire, the ground wire, the first signal output wire, and the second signal output wire are arranged such that at least one of the power supply terminal and the ground terminal is located between the first signal output terminal and the second signal output terminal; and
at least one of the power source wire and the ground wire includes a bypass wiring part that is formed to bypass a portion between the first power source part and the second power source part or between the first ground part and the second ground part.

3. The rotation angle detecting device according to claim 1, wherein the first power source part, the second power source part, the first ground part, the second ground part, the first signal output part, and the second signal output part are formed in the same shape.

4. A rotary drive unit comprising:
the rotation angle detecting device recited in claim 1;
a motor that is configured to rotate the detection object; and
a motor power source wire one end of which is connected to the motor, wherein:
the motor power source wire includes a motor power source terminal at the other end thereof;
the motor power source terminal is connected to the external power source; and
the ground wire and the motor power source wire are arranged such that the ground terminal and the motor power source terminal are adjacent to each other.

5. The rotary drive unit according to claim 4, wherein the power source wire, the ground wire, the first signal output wire, the second signal output wire, and the motor power source wire are arranged such that at least one of the second signal output terminal and the ground terminal is located between the first signal output terminal and the power supply terminal, and the motor power source terminal.

* * * * *